April 7, 1970 L. H. BLOUNT 3,504,502
LIFT DOCK FOR A WATER BORNE VESSEL
Filed Nov. 6, 1967 3 Sheets-Sheet 3

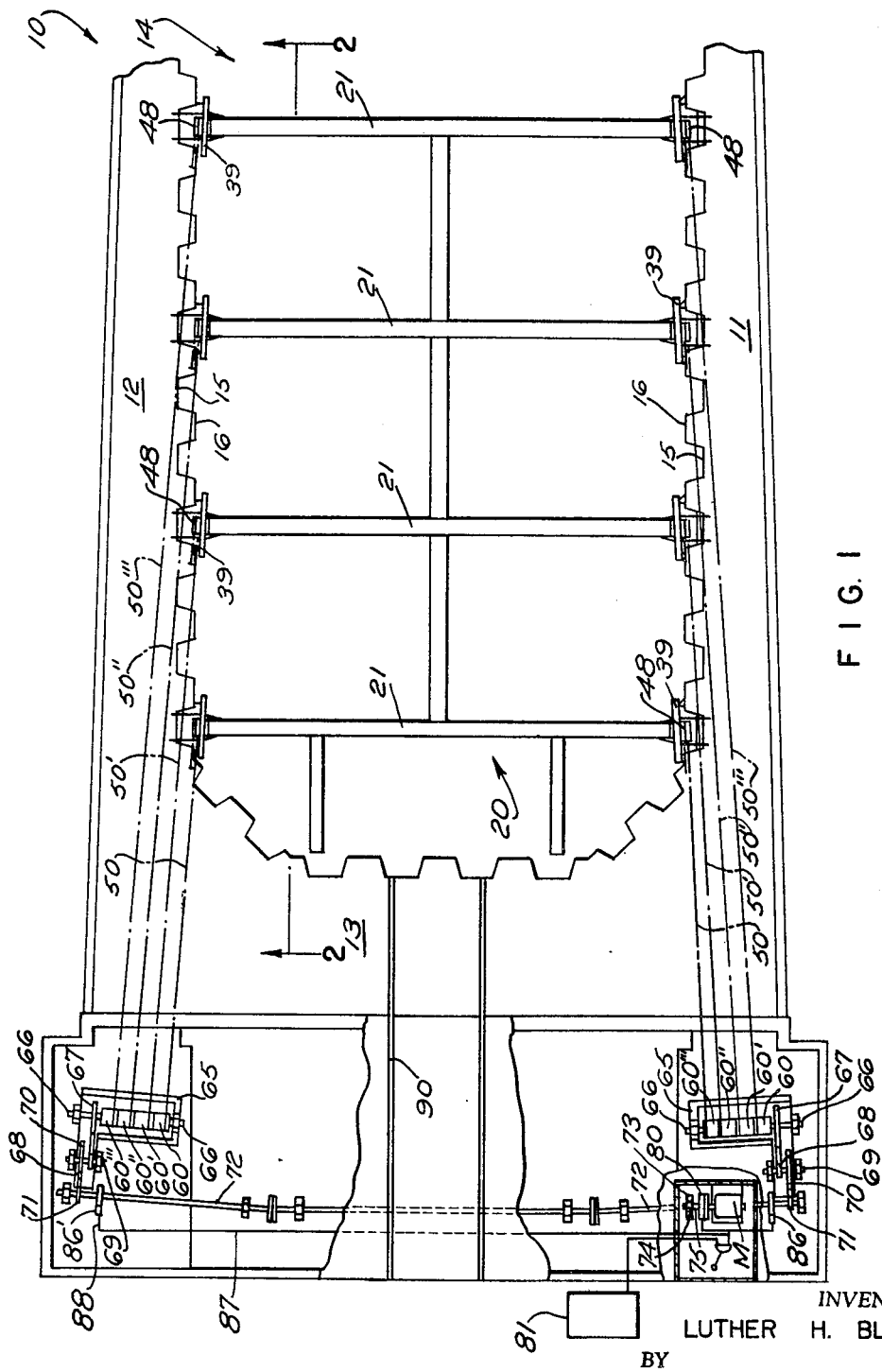

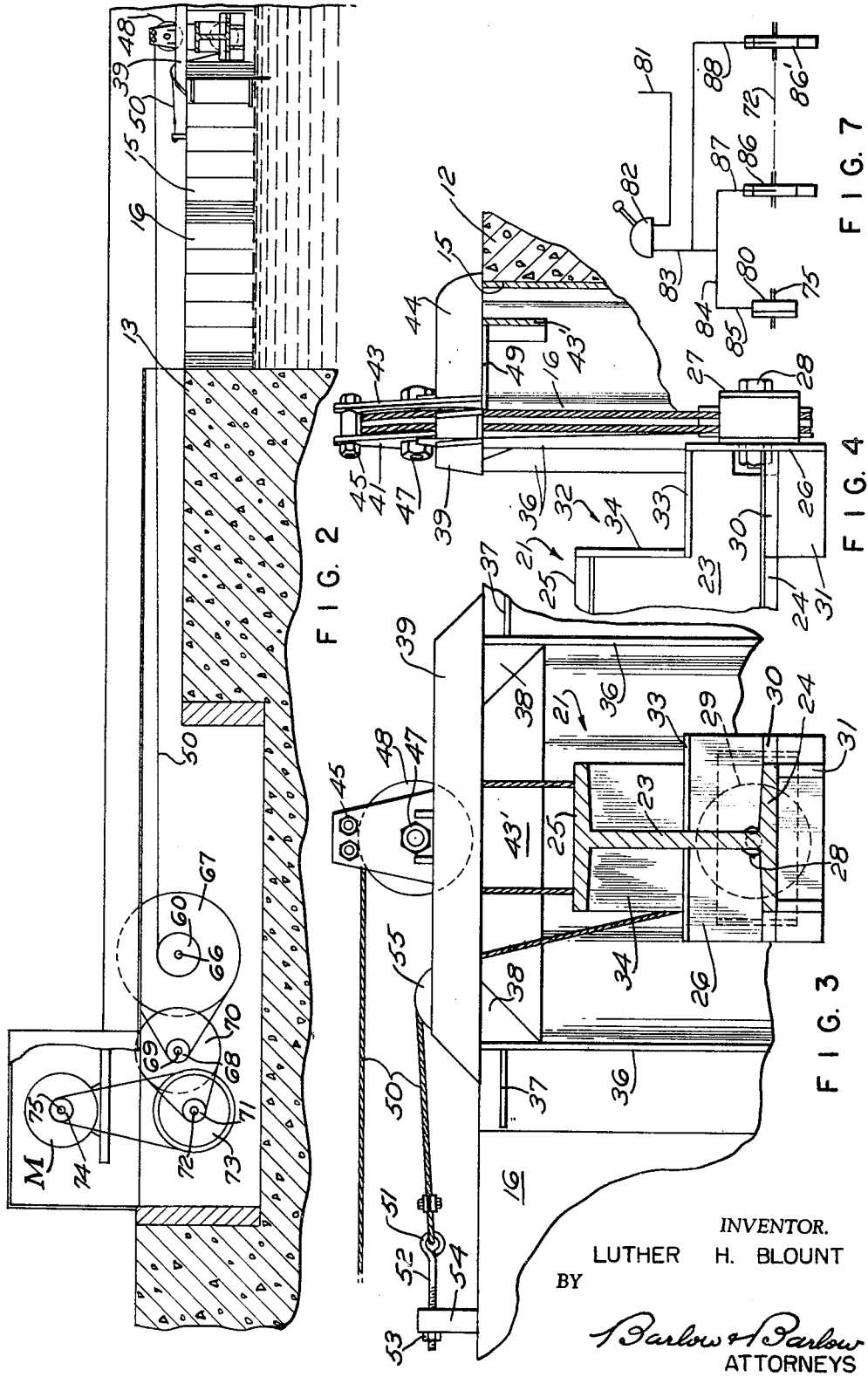

INVENTOR.
LUTHER H. BLOUNT
BY
*Barlow & Barlow*
ATTORNEYS

United States Patent Office                         3,504,502
                                                                    Patented Apr. 7, 1970

1

3,504,502
LIFT DOCK FOR A WATER BORNE VESSEL
Luther H. Blount, Poppasquash Road,
Bristol, R.I. 02809
Filed Nov. 6, 1967, Ser. No. 680,639
Int. Cl. B63c 3/06, 1/02
U.S. Cl. 61—65                                                3 Claims

ABSTRACT OF THE DISCLOSURE

A lift dock apparatus in which the sheaves over which the lifting cables extend to the drums upon which the cables are reeled have their axes all substantially parallel with the axis of the drums.

BACKGROUND OF THE INVENTION

Lift docks are subjected to heavy loads and frequently when cables are used for raising the vessel-supporting structure they are led in a path having right-angle turns and about pulleys for effecting these right-angle turns, which pulleys are subjected to tremendous strains, and heavy frictions are developed and consequent power losses as a result thereof. Further the controls for these cables are not always adequate and many lack adequate safety devices.

SUMMARY

The dock has side walls and an open end for receiving a vessel therethrough with a vessel-supporting structure between the side walls. These side walls support a plurality of sheaves, while a cable leads over these sheaves to the vessel-supporting structure and to drums for reeling the cable. Sheaves may also be placed on the vessel-supporting structure with the cables extending between the sheaves in a number of wraps for multiplication of the force applied. The arrangement of the drums is such that the axes of the drums are substantially parallel to the axes of the sheaves so that the cable has a minimum amount of deflection as reeling occurs. The drums are controlled by some power means for reeling the drums and brakes together with clutches are utilized for additional control of the drums and the shafts which operate them.

DESCRIPTION OF THE DRAWINGS

FIG. 1 is a top plan view showing the lift dock and the vessel-supporting structure therein with deck omitted together with a schematic of the controls for lifting the dock;

FIG. 2 is a fragmental elevation illustrating the connection between the power means and the sheaves or the lift dock;

FIG. 3 is an elevational view of a fragmental portion illustrating the sheaves at one location of the dock;

FIG. 4 is an end view of the portion shown in FIG. 3;

FIG. 7 is a diagrammatic view illustrating the control for the brakes and clutches.

DESCRIPTION OF THE PREFERRED EMBODIMENT

With reference to the drawings, and particularly FIG. 1, 10 designates generally a dock having side walls 11 and 12, a closed end 13 and an open end 14 through which a vessel may enter. The vertical side walls 11 and 12 may be formed of metal interlocking sheathing such as seen

Figure 6:
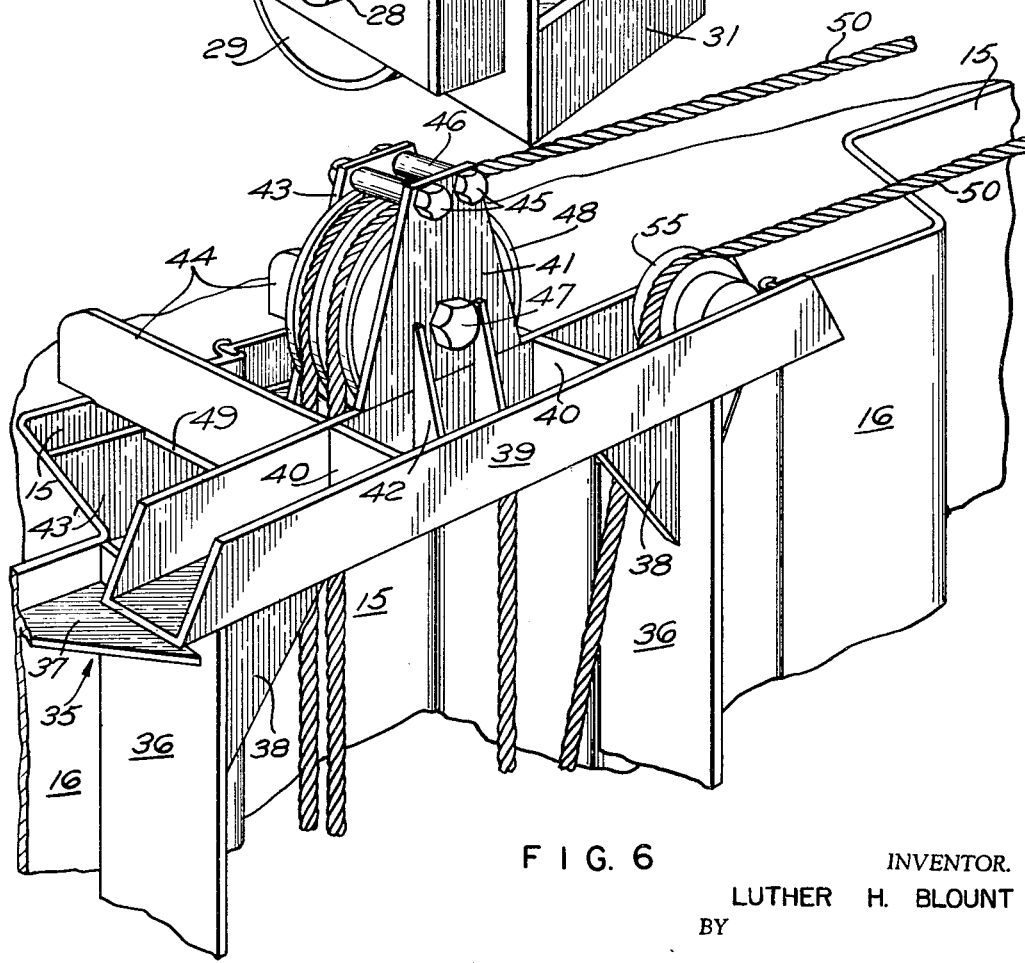
FIG. 6 is a perspective view of the cable arrangement along the side wall of the dock.

2 more fully in FIG. 6 and which forms a plurality of recesses 15 from the face portion 16 along the length thereof or of other suitable construction. These recesses are preferably utilized for location of the lifting cables to be described.

Figure 5:
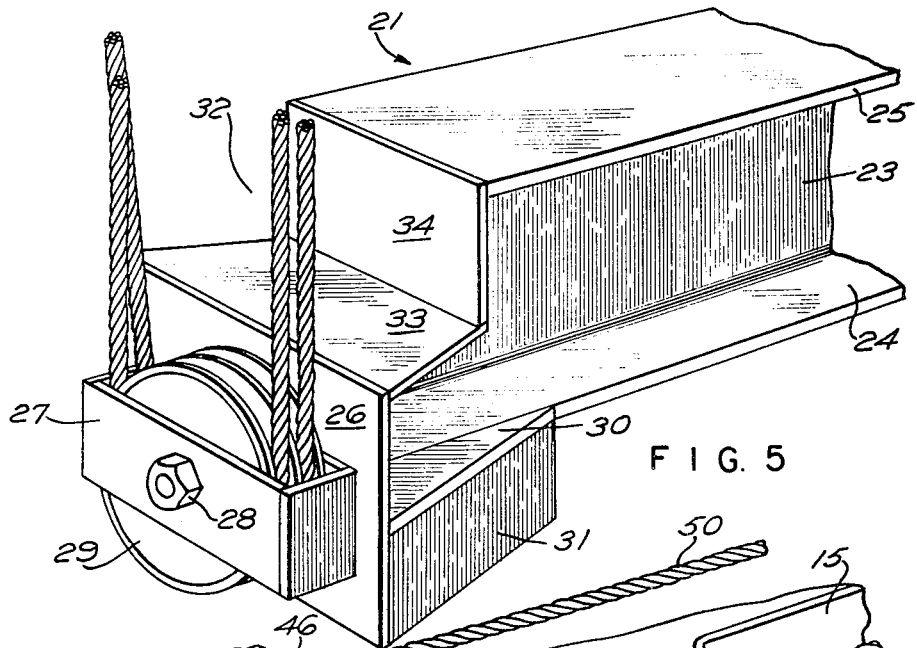
FIG. 5 is a perspective view illustrating the mounting of the sheave and cables extending about the sheave on the vessel-supporting structure.

The vessel-supporting structure 20 is of a size and shape to fit between the side walls 11 and 12 and 13 and is in effect a platform upon which the vessel may rest. This supporting structure comprises a plurality of heavy I beams 21 which extend laterally and longitudinally of the structure upon which a deck (not shown) may be supported and secured in a manner well known to those skilled in the steel erection trades. One of these I beams is shown in perspective in FIG. 5 as having a central web portion 23 with lower flanges 24 and upper flanges 25 extending from either side thereof. The web 23 provides a support to which the platform framing may be welded thereby creating a deck flush with the flange 25 as well understood by those skilled in the art. At each end of each I beam there is a vertical plate 26 to which there is attached a frame 27 providing means for supporting a shaft 28 which supports the double groove pulley 29 for the cables to extend about. This plate 26 extends from about a mid point of the web 23 downwardly and is supported by flaring plates 30 extending from the flange 24 and further supported by vertical braces 31 extending from the plate 26 to the edge of the flange 24 and secured to the flaring plates 30. Further the end of the I beam is notched as at 32 and a plate 33 is secured to the edge of the plate 26 and to the upper edge of the web 23 at its notched portion and further secured to a bracing plate 34 extending from the flange 25 to the plate 33 and against the end of the web 23. All of these securings are preferably by welding.

Above each of the sheaves 29 at the end of the I beams, there is a structure such as shown in FIG. 6. Spaced brackets 35 extend outwardly from spaced faces 16 of the sheathing each comprising a vertical plate 36 and braces 37 and 38 to support a channel member 39 between two of such brackets which channel in turn is further braced by webs 40. This channel supports a sheave mounting plate 41 further braced as at 42. A companion mounting plate 43 is securely mounted by means of a web 43' spanning recess 15 on the metal sheathing and horizontal plate 49, while a brace 44 attached to channel 39 and plates 49 assists in supporting both, all being welded together. These mounting plates are secured together by bolts 45 with intermediate spacers 46 to hold them in vertical position while a bolt 47 passes through these mounting plates and serves as a shaft for mounting the double groove sheave 48 between these mounting plates.

The lifting cables extend about the sheaves 29, 48. Referring to FIG. 3, a cable 50 is secured to the eye 51 of bolt 52, which may be adjusted by means of nut 53 through the anchoring means 54 for adjustment of the cable, thence over an arcuate fixed guide 55 grooved to receive it, thence about the inside groove of the sheave 29 on the I beam 21 and up over the inside groove of the sheave 48, then downwardly about the outside groove of sheave 29 and up over the outside groove of the sheave 48 and finally to the windup drum 60 located on the onshore side of the dock.

A similar cable and sheave arrangement is provided at each end of each I beam. Thus, as illustrated, there are four such cables 50, 50', 50'', and 50''', all extending in substantially parallel relation from the sheaves on the side walls of the dock. The sheaves on the side walls of the dock are preferably angled so the axis of the sheaves are at right angles to the lead of the cables from these sheaves, each to its respective windup drum as seen in FIG. 1.

A plurality of drums 60, 60', 60" and 60'" are arranged on a common shaft 66 to be rotated in unison and all are mounted in a frame structure 65 with a drive structure on shaft 66. The drive for speed reduction purposes may be by means of a belt or chain extending about a large pulley 67 to a small pulley 68 on shaft 69 which is driven by a large pulley or gear 70 from a small pulley 71 on shaft 72 which, in turn, is driven by a large pulley or gear 73 from a small pulley or gear 74 on the portion of shaft 75 which is the output shaft of an air clutch 80 coupled to electric motor M, all as schematically shown in FIG. 2.

Referring to FIG. 7, the air clutch 80 that is interposed on shaft 75 of electric motor M is fed from an air supply designated generally as at 81 through an air control valve 82 and from this valve by conduits 83, 84 and 85. Rotation of shaft 72 is controlled by normally spring closed air brakes 86, 86'. Since air clutch requires pressure for driving engagement and since pressure is required to release the brakes 86, 86' on shaft 72, conduits 87, 88 are connected to conduit 83 so that as the clutch engages the shaft 75 for driving shaft 72, the brakes 86, 86' are released. Should air fail, the brakes would be set by spring pressure to prevent rotation.

The shaft 72 extends over to a duplicate layout on the other side of the dock, which by reason of this common shaft 72, both systems are operated by the motor, clutch and drums to simultaneously reel in the cables on both sides of the dock. The additional brake 86' is located on this other side and is controlled as mentioned above when the clutch causes rotation of the shaft 75.

The drums are on axes 66 which are at right angles to the lead of the cables 50, 50', 50" and 50'" as are the sheaves 48. The sheaves 29 however, do not have their axes exactly parallel with the axes of the sheave 48 but are at right angles to the lengthwise extent of the vessel-supporting structure or parallel to the I beams which support them. However, the cylindrical structure of the cables eliminates any frictional distortion because of this slightly different angular relation. Adjustments of the cables may be had by reason of the bolt 52 and nut 53 (FIG. 3) to such slight extent as is necessary.

As mentioned above, the I beams provide a support for the decking over structure and this decking over structure may carry tracks or other convenient supporting parts to match with tracks 90 on the shore for rolling a cradle from the vessel-supporting structure on to the shore as may be desired. The notches 32 in the I beams accommodate the channel 39 when the vessel-supporting structure is raised to its limit, and it will of course be apparent that the cables may be enclosed in some shore decking over structure as may be desired such being omitted for a clearer disclosure.

I claim:

1. An apparatus for elevating a vessel comprising a dock having side walls and an open end through which a vessel may enter, a vessel-supporting structure between said walls, a plurality of sheaves at spaced locations along said side walls above said structure having their axes at an angle to the longitudinal axis of the structure, a plurality of drums corresponding to the number of side wall sheaves in end to end relation with their axes angled to the longitudinal axis of said structure and substantially parallel to the axis of the sheaves, cables extending in a straight line from said drums to said sheaves, said drums being at such location and so oriented that the cables from said drums to the side wall sheaves extend at right angles to the axis of said drums and in spaced parallel relation and at substantially right angular relation to the axis of said sheaves, and over said sheaves to said structure, motive power means coupled to said drums and brake means to control the rotation of said drums.

2. An apparatus as in claim 1 wherein clutch means is interposed between said motive power means and said drums, said clutch and brake means being controlled by a common source.

3. An apparatus as in claim 1 wherein adjustable means secure the end of the cables to said side wall.

References Cited

UNITED STATES PATENTS

| | | | |
|---|---|---|---|
| 481,411 | 8/1892 | Moran | 61—65 |
| 988,136 | 3/1911 | O'Rourke | 61—65 |
| 3,073,125 | 1/1963 | Pearlson | 61—65 |
| 3,114,246 | 12/1963 | Collin | 61—65 |

JACOB SHAPIRO, Primary Examiner